UNITED STATES PATENT OFFICE 2,674,620

PROCESS FOR PREPARING A MIXTURE OF TRICHLOROACETIC DERIVATIVES AND REACTION PRODUCTS THEREOF

Joseph A. Sonia and Eric H. Scremin, Niagara Falls, N. Y., assignors to Hooker Electrochemical Company, Niagara Falls, N. Y., a corporation of New York No Drawing. Application August 5, 1950, Serial No. 177,956

11 Claims. (Cl. 260—487)

This invention relates to a process for preparing a mixture of trichloroacetic derivatives and reaction products thereof and more particularly to methods for treating said mixture for conversion into trichloroacetic acid and esters thereof.

It is known that trichloroacetic acid may be prepared by introducing chlorine into acetic acid at elevated temperatures in the presence of a chemical catalyst such as acetic anhydride, sulphur or phosphorus. However, to the best of our knowledge and belief such processes have not been satisfactory because they are inefficient, expensive and time consuming. Also, they are not capable of producing high grade trichloroacetic acid in good yield because of the formation of excessive amounts of undesirable by-products and dark colored decomposition products during the course of the reaction, especially when attempting to get a high yield of product by chlorinating at elevated temperatures over long periods of time. Therefore in order to obviate these disadvantages of decomposition and to produce a high yield of substantially pure product, it has been necessary in the prior art processes to effect the chlorination of acetic acid or its lower chlorinated derivatives under carefully controlled relatively mild chlorinating conditions, with accompanying inefficiencies and time consuming procedures; however, even with such precautions, it has been necessary to use a recrystallization procedure to remove the dichloro- and monochloro-acetic acids and other impurities, thereby allowing for the recovery of a substantially pure trichloroacetic acid product. Such a recrystallization step is, of course undesirable since it requires extra labor, is time-consuming, adds materially to the cost of the final product, and reduces the overall yields.

It is therefore an object of this invention to provide a simple economical process readily adaptable to large scale commercial manufacture that produces a mixture of reaction product which may be converted in accordance with our invention, in high overall yield, to substantially pure trichloroacetic acid, the organic esters thereof, or sodium trichloroacetate. It is also an object of the present invention to provide a direct process for the preparation of trichloroacetic acid of a purity that is acceptable in commerce, the said process not involving a recrystallization procedure. It is a further object of the present invention to provide an easily operatable process for the production of trichloroacetic acid which results in a final product having at least 95 per cent by weight trichloroacetic acid content. A further object of the invention is to provide a process for the production of trichloroacetic acid which utilizes a series of easily performed steps, and yet, results in a substantially pure product. Another object is to provide a simple, economical process for producing pure esters of trichloroacetic acid. Other objects will become apparent hereinafter.

We have now found that trichloroacetic acid of high purity may be produced by our process which comprises: chlorinating a material selected from the group consisting of acetic acid, acetic anhydride, their lower chlorinated derivatives and mixtures thereof with chlorine in the presence of chemical catalysts, elevated temperatures up to 250° C., under the influence of actinic light, and under substantial superatmospheric pressures, until a trichloroacetic derivative mixture is formed comprising substantial proportions of trichloroacetic acid, trichloroacetic anhydride and trichloroacetyl chloride. We have also found that said mixture of reaction products can be treated with water at elevated temperatures, up to 120° C. but preferably at about 75 to 90° C., to convert the trichloroacetic anhydride and trichloroacetyl chloride to trichloroacetic acid, without decomposing the trichloroacetic acid to chloroform or other decomposition products. This finding was surprising in view of the known arts for making medicinal chloroform by the decomposition of trichloroacetic acid and for selectively decomposing trichloroacetic acid to chloroform and carbon dioxide in order to allow for recovery of dichloroacetic acid. We have also found that our crude mixture of reaction products comprising trichloroacetic acid, trichloroacetic anhydride and trichloroacetyl chloride can be converted to substantially pure sodium trichloroacetate by the process which comprises treating said mixture with an excess of caustic soda as a fifty per cent concentration aqueous solution of sodium hydroxide and heating to a temperature of not more than fifty degrees centigrade. Still further we have found that substantially pure esters of trichloroacetic acid may be prepared in high yield from our crude mixture of reaction products by the process which comprises treating said crude with an organic alcohol under suitable conditions for esterification. Thus, substantially pure isopropyl trichloroacetate may be prepared in a high yield by reaction of isopropyl alcohol with our crude mixture of reaction products which contain substantial quantities of trichloroacetic acid, trichloroacetic anhydride and trichloroacetyl chloride.

Our invention will be more readily understood from a consideration of the following examples, however, we do not wish to be limited thereto except as defined in the appended claims:

Example I

Fifty-eight parts of glacial acetic acid and 1.7 parts of phosphorous trichloride is charged into a pressure chlorinator provided with heating means, temperature recording means, a brine cooled reflux condenser vented through a pressure throttling valve, a chlorine well line and a mercury vapor lamp emitting light including the wave lengths of 2800 to 5400 angstrom units. About 286 parts of elemental chlorine under a pressure of 90 pounds per square inch is introduced into the irradiated reaction mixture and the pressure in the reactor is allowed to build up to about 30 pounds per square inch gauge as quickly as practicable by proper regulation of the throttling valve, said pressure being maintained throughout the entire reaction period. The temperature of the reaction mixture is allowed to rise to about 200° C. within the first half of the reaction period and is maintained as such during the remainder of the reaction.

After all the chlorine is introduced, the reactor is vented and discharged. A crude trichloroacetic derivative is recovered having the following analysis:

| | |
|---|---|
| Melting point °C | 53 |
| Specific gravity at 60° C | 1.614 |
| Free chloride | Nil |
| Monochloroacetic derivative | Nil |
| Dichloroacetic derivative per cent | 0.97 |
| Trichloroacetic derivative do | 99.2 |

The trichloroacetic derivatives recovered contain about 20.6% trichloroacetic anhydride, the remainder being trichloroacetic acid including a very minor proportion of trichloroacetyl chloride.

Water is added in small increments to a 100 gram sample of the crude reaction product and the mixture heated to a temperature of about 80° C. until the melting point reaches a maximum value of 58.4° C. and the product analyzes for trichloroacetic acid. Therefore, water in the amount of 1.2% by weight of the crude, must be added to the remaining crude product and the mixture heated to a temperature of 80° C. in order to effect the conversion to substantially pure trichloroacetic acid which is recovered in 96% yield by vacuum distillation at a temperature of about 130° C. at an absolute pressure of about 80 mm.

Example II

In a manner after Example I, 50 parts of glacial acetic acid and 1.5 parts by weight of phosphorous trichloride is chlorinated by introducing 286 parts of elemental chlorine into the reaction mixture which is initially heated to a temperature of about 30° C. The chlorination is effected as in Example I under a pressure of about 35 pounds per square inch and at a temperature of about 200 to 210° C. in the presence of actinic light.

Crude trichloroacetic derivative product having the following analysis is recovered:

| | |
|---|---|
| Melting point °C | 35.7 |
| Specific gravity at 60° C | 1.635 |
| Free chloride | Nil |
| Monochloroacetic derivative | Nil |
| Dichloroacetic derivative per cent | 1.75 |
| Trichloroacetic derivative do | 97 |

The trichloroacetic derivatives recovered contain about 56.2% trichloroacetic anhydride, the remainder being trichloroacetic acid including a very minor proportion of trichloroacetyl chloride.

In a manner after Example I, the crude product is converted to substantially pure trichloroacetic acid having a melting point of 56.2° C. by the addition of water in the amount of 3.3% by weight of the crude and heating said mixture to a temperature of about 80° C. prior to the distillation.

Example III

Methyl alcohol is continuously introduced into a crude trichloroacetic derivative mixture similar to that recovered in Example I, contained in a reactor provided with heating means, a column and a condenser. An azeotrope of methyl alcohol-water-ester is continuously flashed off at a temperature of about 95 to 110° C. through the column; said azeotrope which is condensed and collected, separates into two layers in the receiving vessel. The methyl trichloroacetate ester layer on the bottom is fractionated. The ester fraction which distills at a temperature of 154° C. is purified by washing with a dilute solution of sodium carbonate and is dried over calcium chloride.

The above procedure is repeated again with methyl alcohol and twice with ethyl alcohol.

The following chart gives a summary of the results obtained:

| Analysis | Methanol Theory | Methanol No. 1 | Methanol No. 2 | Ethanol Theory | Ethanol No. 1 | Ethanol No. 2 |
|---|---|---|---|---|---|---|
| Total chlorine percent | 60 | 59.20 | 58.95 | 55.6 | 55.10 | 54.95 |
| Free chloride | | Nil | Nil | | Nil | Nil |
| Refractive index, 20° C | | 1.4562 | 1.4557 | | 1.4498 | 1.4493 |
| Specific gravity, 25/15.5° C | | 1.4767 | 1.4753 | | 1.3761 | 1.3767 |
| Methyl or Ethyl trichloroacetate yield on trichloro derivative percent | | 94.8 | 95 | | 94.8 | 95 |
| Methyl or Ethyl trichloroacetate yield on alcohol percent | | 81.7 | 82 | | 77.9 | 80.4 |

Example IV

In a manner after Example I, except in the absence of a phosphorous catalyst, 4800 pounds of glacial acetic acid was chlorinated using elemental chlorine as the chlorinating agent. The chlorination was effected as in Example I under a superatmospheric pressure of about 35 pounds per square inch and up to a maximum temperature of 200° C., said temperature being maintained during the last quarter of the reaction period by applying external heating. The chlorine was introduced into the reaction mixture for a period of about 45 hours after which crude trichloroacetic derivative product having the following analysis was recovered:

| | |
|---|---|
| Melting point °C | 51.6 |
| Specific gravity at 60° C | 1.605 |
| Free chloride per cent | 0.3 |
| Monochloroacetic derivative do | 0.1 |
| Dichloroacetic derivative do | 1.8 |
| Trichloroacetic derivative do | 95.4 |

The trichloroacetic derivatives recovered, contained about 7% trichloroacetyl chloride, said acid chloride being retained in the reaction mixture by the effect of superatmospheric pressure. The acid chloride alone, which is formed in situ, and in combination with other chemical ingredients of the reaction mixture which are likewise formed in situ, act to catalyze the chlorination to the trichloro stage.

As in Example I, the crude product was converted to substantially pure trichloroacetic acid having a melting point of 56.8° C. by the addition of water in the amount of 1.5% by weight of the crude and heating said mixture to a temperature of about 80° C. prior to distillation.

Example V

In a manner after Example I, except in the absence of a phosphorus catalyst, 4350 pounds of glacial acetic acid was chlorinated using elemental chlorine. The chlorination was effected as in Example I under a superatmospheric pressure of about 35 pounds per square inch and up to a maximum temperature of 200° C., said temperature being maintained during the last quarter of the reaction period by applying external heating. Crude trichloroacetic derivative product having the following analysis was recovered:

| | |
|---|---|
| Melting point _____°C__ | 50 |
| Specific gravity at 60° C_____ | 1.600 |
| Free chloride_____ | Nil |
| Monochloroacetic derivative_____ | Nil |
| Dichloroacetic derivative_____per cent__ | 2.6 |
| Trichloroacetic derivative_____do____ | 95.2 |

The trichloroacetic derivatives recovered contained about 7.1% trichloroacetyl chloride which acts to catalyze the chlorination to the trichloro stage.

As in Example I, the crude product was converted to substantially pure trichloroacetic acid having a melting point of 57.0° C. by the addition of water in the amount of 1.25% by weight of the crude and heating said mixture to a temperature of about 85° C. prior to the distillation.

The chemical catalysts which we have found useful in the process of our invention are phosphorus, sulphur and their acids, and their chlorinated derivatives, for example phosphorus trichloride, phosphorous acid, phosphorus oxychloride, sulphuric acid, etc.; acid chlorides and anhydrides, which are produced in situ during the course of our reaction and are retained in the reaction mixture by the influence of superatmospheric pressure; and still others such as benzotrichloride, which may be added at the start of the reaction if so desired. Although a useful effect may be obtained by using from .05% to 25% by weight of the starting material of any one or combination of these catalysts, we find that optimum results can be obtained by using about 0.1 to 3% by weight of preferable phosphorus trichloride or by maintaining 3 to 20% by weight of the starting material of an acid chloride formed in situ in the reaction mixture.

Pressures of from about 10 pounds per square inch gauge to about 70 pounds per square inch gauge have been found to produce effective results in our process; however, because of practical limitations we prefer to conduct our reaction at pressures from about 25 to 45 pounds per square inch gauge.

Any source of actinic light may be utilized to promote the chlorination, however, light containing substantial proportions of wave lengths of 2800 to 5400 angstrom units is preferred.

The introduction of chlorine may be started at room temperature; however, we have found that it is more economical to heat the reaction mixture up to a temperature of at least 30° C., before introducing the chlorine, whereupon the temperature is built up to preferably between about 190 and 220° C. by applying external heating; said temperature being maintained at least during the end of the reaction period, and preferably during the last half of the reaction period.

Although we prefer to effect the chlorination of glacial acetic acid, we have found that we may also chlorinate mixtures of acetic acid and acetic anhydride. By effecting the chlorination of a mixture composed of lower chlorinated acetic acids, acid chlorides and anhydrides such as is obtained as mother liquor in commercial processes for producing monochloroacetic acid, a substantial saving in time required for completion of the reaction to produce substantially pure trichloroacetic acid may be realized by operating in accordance with our invention.

The quantity of water to be added to the crude product in order to make substantially pure final product is a variable which depends upon the amount of acid anhydride and acid chlorides produced which in turn may depend on the maximum temperature of chlorination and the composition of the starting material. It may be determined experimentally by progressively adding small increments of water to a sample of the crude until a product with a maximum melting point is obtained. The maximum melting point is readily detectable since the addition of an increment over and above that which is necessary causes the melting point of the product to be lowered. We have found it advantageous to add the water to the crude product, and heat to a temperature of about 80° C. prior to effecting a distillation at temperatures between 120 and 140° C. and vacuum of 60 to 100 mm. pressure for recovery of the final product. In this way, the conversion of the anhydrides and acid chlorides which are produced by our method is accelerated and no additional steps are necessary in order to obtain a high grade product. However, if desirable, it is only necessary to add the water to the product, heat and permit a sufficient time to elapse for conversion to the acid. Alternatively, the water may be introduced into the crude reaction mixture in the amount necessary in the form of live steam.

Among the foregoing examples we have shown the esterification of a crude trichloroacetic derivative reaction mixture to produce substantially pure methyl and ethyl trichloroacetates. However, it is to be understood that other hydroxy compounds are suitable reactants in accordance with our invention for example isopropyl alcohol, benzyl alcohol, ethylene glycol, diethylene glycol, etc. to make the corresponding trichloroacetate esters.

Although we have described our invention with reference to certain preferred specific embodiments thereof we do not wish to be limited thereto except as defined in the claims appended hereto.

We claim:

1. The process for preparing a mixture of reaction product containing trichloroacetic acid, trichloroacetic anhydride and trichloroacetyl chloride which includes effecting the reaction of chlorine with a material selected from the group consisting of acetic acid, acetic anhydride, mixtures of their lower chlorinated derivatives as is obtained as mother liquor in commercial processes for producing monochloroacetic acid and mixtures thereof, in the presence of chemical catalysts, at elevated temperatures at least during the last stage of the chlorination of between 190° and 250° C., under the influence of actinic light, and under substantial superatmospheric pressures between about 10 and 70 pounds per square inch.

2. The process according to claim 1 wherein the chemical catalyst is present in proportions between 0.1 and 25% by weight of the starting material, the reaction mixture is heated up to a temperature between 190 and 220° C., and the superatmospheric pressure is maintained at between 10 and 70 pounds per square inch.

3. The method which includes the steps of heating the mixture of reaction product obtained by the process of claim 1 with sufficient water to selectively convert the trichloroacetic anhydride and trichloroacetyl chloride to the corresponding acid while the trichloroacetic acid originally present in the reaction mixture remains substantially unchanged and recovering substantially pure trichloroacetic acid therefrom.

4. The process for preparing a mixture of reaction product containing trichloroacetyl chloride, and substantial proportions of trichloroacetic acid and trichloroacetic anhydride, which includes: effecting the reaction of chlorine with glacial acetic acid, in the presence of a chemical catalyst, under the influence of actinic light, heating to a reaction temperature of about 200° C. at least during the last stage of the chlorination period, and maintaining a superatmospheric pressure between about 30 and 40 pounds per square inch.

5. The method which includes the steps of heating to a temperature of between 75 and 120° C. the mixture of reaction product obtained by the process of claim 4, with sufficient water to selectively convert any trichloroacetic anhydride and trichloroacetyl chloride to trichloroacetic acid and distilling under vacuum to recover substantially pure trichloroacetic acid therefrom.

6. The method of claim 5 wherein the conversion is effected at a temperature of about 75 to 90° C. and the product thus obtained is distilled at a temperature between about 120 and 140° C. under a vacuum of about 60 to 100 mm. pressure.

7. The method which includes the steps of reacting the crude mixture of reaction product obtained by the process of claim 1 with an organic alcohol and recovering substantially pure esters of trichloroacetic acid therefrom.

8. The method which includes the steps of reacting the crude mixture of reaction product obtained by the process of claim 1 with methyl alcohol and recovering substantially pure methyl trichloroacetate therefrom.

9. The method which includes the steps of reacting the crude mixture of reaction product obtained by the process of claim 1 with methyl alcohol and recovering substantially pure ethyl trichloroacetate therefrom.

10. The method which includes the steps of reacting the crude mixture of reaction product obtained by the process of claim 1 with isopropyl alcohol and recovering substantially pure isopropyl trichloroacetate therefrom.

11. A process which comprises preparing a mixture of reaction products containing trichloroacetic acid, trichloroacetic anhydride and trichloroacetyl chloride by the method which includes effecting the reaction of chlorine with a material selected from the group consisting of acetic acid, acetic anhydride, mixtures of their lower chlorinated derivatives as is obtained as mother liquor in commercial processes for producing monochloroacetic acid, and mixtures thereof, in the presence of chemical catalysts, at elevated temperatures, at least during the last stage of the chlorination of between 190° and 250° C., under the influence of actinic light, and under substantial superatmospheric pressures between about 10 and 70 pounds per square inch; and, heating the mixture of reaction products so obtained with sufficient water to selectively convert the trichloroacetic anhydride and trichloroacetyl chloride to the corresponding acid while the trichloroacetic acid originally present in the reaction mixture remains substantially unchanged and recovering substantially pure trichloroacetic acid therefrom.

References Cited in the file of this patent

UNITED STATES PATENTS

| Number | Name | Date |
|---|---|---|
| 1,129,165 | Buchner | Feb. 23, 1915 |
| 1,757,100 | Strosacker | May 6, 1930 |
| 2,472,946 | Hart et al. | June 14, 1949 |
| 2,492,417 | Frilette | Dec. 27, 1949 |

OTHER REFERENCES

Chem. Abstracts, vol. 42, page 5848 (1948).
J. Am. Chem. Soc., vol. 66, p. 1039 (1944).
Beilstein: "Handbuch der organischen Chemie," vol. II (1920), pp. 206–210.
Buckney et al.: Berichte, vol. 10, pp. 698–699 (1877).
Scattergood et al.: J. Am. Chem. Soc., vol. 72, pp. 2808–9 (June 1950).
Ind. and Eng. Chem., vol. 39, pp. 391–2 (1947).